US008434315B2

(12) United States Patent
Sawada et al.

(10) Patent No.: US 8,434,315 B2
(45) Date of Patent: May 7, 2013

(54) COMPRESSOR DRIVING TORQUE ESTIMATING APPARATUS

(75) Inventors: Yoshikatsu Sawada, Kariya (JP); Yasutane Hijikata, Nagoya (JP)

(73) Assignee: Denso Corporation, Kariya (JP)

( * ) Notice: Subject to any disclaimer, the term of this patent is extended or adjusted under 35 U.S.C. 154(b) by 893 days.

(21) Appl. No.: 12/153,574

(22) Filed: May 21, 2008

(65) Prior Publication Data

US 2008/0292470 A1 Nov. 27, 2008

(30) Foreign Application Priority Data

May 21, 2007 (JP) .................................. 2007-133866

(51) Int. Cl.
*G01K 13/00* (2006.01)
(52) U.S. Cl.
USPC ............... 62/129; 62/157; 62/158; 62/228.1; 62/228.3; 62/228.4; 62/228.5; 62/231; 62/244; 374/141; 374/45; 374/46; 374/47; 374/48; 374/49; 374/50; 702/1; 702/33; 702/34; 702/41; 702/127; 702/182; 702/187; 702/189; 700/299; 417/44.1; 417/213; 417/278; 417/280; 417/290
(58) Field of Classification Search ............... 62/129, 62/157, 158, 228.1, 228.3–228.5, 231, 244; 374/141, 45–50; 702/1, 33, 34, 41, 44, 127, 702/182, 187, 189; 700/299; 417/44.1, 213, 417/278, 280, 290
See application file for complete search history.

(56) References Cited

U.S. PATENT DOCUMENTS 5,924,296 A  7/1999  Takano et al.
6,463,749 B2 10/2002  Niimi
2002/0020176 A1* 2/2002 Kimura et al. ................. 62/133
2002/0069656 A1  6/2002  Niimi
2003/0154731 A1  8/2003  Imai et al.
2005/0247073 A1 11/2005  Hikawa et al.
2007/0180841 A1* 8/2007  Bae et al. ..................... 62/228.1
2007/0237648 A1 10/2007  Ooya

FOREIGN PATENT DOCUMENTS

| JP | A-61-195230 | 8/1986 |
| JP | A-4-283359 | 10/1992 |
| JP | A-11-170858 | 6/1999 |
| JP | A-2002-172931 | 6/2002 |
| JP | A-2003-239857 | 8/2003 |
| JP | A-2004-60457 | 2/2004 |
| JP | 2004066858 A * | 3/2004 |
| JP | A-2005-30330 | 2/2005 |
| JP | A-2006-272982 | 10/2006 |
| JP | A-2007-278213 | 10/2007 |

* cited by examiner

*Primary Examiner* — Frantz Jules
*Assistant Examiner* — Azim Abdur Rahim
(74) *Attorney, Agent, or Firm* — Oliff & Berridge, PLC

(57) ABSTRACT

A compressor drive torque estimating device to be adapted for a system provided with a refrigeration cycle in which a refrigerant is circulated by a compressor driven by a drive source mounted in a vehicle, comprising heat load detecting means for detecting a heat load of the refrigeration cycle, a storage unit storing a plurality of estimated drive torque characteristics establishing correlation between a drive torque change characteristic of the compressor and an elapsed time from a time of start of operation of the compressor, an estimated drive torque characteristic selecting means for selecting the one of the plurality of estimated drive torque characteristics stored in the storage unit based on detected values detected by the heat load detecting means, and an estimated drive torque calculating means for calculating an estimated drive torque of the compressor based on the estimated drive torque characteristic selected by the estimated drive torque characteristic selecting means.

12 Claims, 6 Drawing Sheets

COMPRESSOR DRIVING TORQUE ESTIMATING APPARATUS

TECHNICAL FIELD

The present invention relates to a torque estimating device for detecting a drive torque of a compressor.

BACKGROUND ART

A compressor of a vehicular air-conditioning system has obtained its drive power from a vehicle engine. In such a case, in general, the compressor drive torque is estimated and the estimated drive torque is used to control the engine output. As a result, it is designed so that even if the drive torque of the compressor changes, the engine speed will not fluctuate. When obtaining the drive power for the compressor from the vehicle engine, suitable estimation of the compressor torque is an important issue.

For example, Japanese Unexamined Patent Publication (A) No. 2006-272982 discloses the following type of torque estimating means.

At the initial period of startup of a compressor, a startup stage torque estimating means estimates the torque of the compressor. At the steady state, a stable stage torque estimating means estimates the torque of the compressor. For this purpose, the above two torque estimating means are successively switched after compressor startup, so that the torque can be suitably estimated in accordance with the stage after compressor startup.

In this regard, the rising behavior of the drive torque in the transitory state such as right after startup of the compressor differs depending on heat load such as the state of the high pressure side pressure and low pressure side pressure etc. Due to this, in the estimation of the torque of a compressor such as in Japanese Unexamined Patent Publication (A) No. 2006-272982, if estimating the rise in the drive torque right after startup of the compressor without considering the heat load, depending on the conditions, there will be the problem of a discrepancy between the estimated drive torque and the actual compressor drive torque.

DISCLOSURE OF THE INVENTION

Therefore, the present invention has the solution of the problems in the prior art and has as its object the suppression of discrepancy between the estimated drive torque in a transitory state such as right after compression start of a compressor, and the actual compressor drive torque.

To achieve the above object, the present invention has as its first aspect a compressor drive torque estimating device to be adapted for a system provided with a refrigeration cycle (1) in which a refrigerant is circulated by a compressor (2) driven by a drive source (11) mounted in a vehicle, comprising heat load detecting means (124, 125) for detecting a heat load of the refrigeration cycle (1), a storage unit storing a plurality of estimated drive torque characteristics establishing correlation between a drive torque increase characteristic of the compressor (2) and an elapsed time from a time of start of operation of the compressor (2), an estimated drive torque characteristic selecting means (S42) for selecting one of the plurality of estimated drive torque characteristics stored in the storage unit based on detected values detected by the heat load detecting means (124, 125), and an estimated drive torque calculating means (S44) for calculating an estimated drive torque (STrk) of the compressor (2) based on the estimated drive torque characteristic selected by the estimated drive torque characteristic selecting means (S42).

According to this, the estimated drive torque calculating means (S44) selects the optimum characteristic from the plurality of estimated drive torque characteristics establishing correlation between the drive torque increase characteristic and the elapsed time from the time of start of operation of the compressor (2) and calculates the estimated drive torque (STrk) based on the heat load of the refrigeration cycle (1). As a result, it is possible to make the estimated drive torque (STrk) a high precision estimated value suppressed in discrepancy from the actual drive torque of the compressor (2) in the transitory state right after compression start of the compressor (2). Note that the compressor torque increase characteristic in the present invention has a meaning including the behavior of compressor power correlated with the compressor torque.

Further, the present invention has as its second aspect a compressor drive torque estimating device to be adapted for a system provided with a refrigeration cycle (1) in which a refrigerant is circulated by a compressor (2) driven by a drive source (11) mounted in a vehicle, comprising heat load detecting means (124, 125) for detecting a heat load of the refrigeration cycle (1), a storage unit storing a plurality of estimated drive torque characteristics establishing correlation between a drive torque increase characteristic of the compressor (2) and an elapsed time from a time of start of control for stopping operation of the compressor (2), an estimated drive torque characteristic selecting means (S42) for selecting one of the plurality of estimated drive torque characteristics stored in the storage unit based on the detected value detected by the heat load detecting means (124, 125), and an estimated drive torque calculating means (S44) for calculating an estimated drive torque (STrk) of the compressor (2) based on the estimated drive torque characteristic selected by the estimated drive torque characteristic selecting means (S42).

According to this, the estimated drive torque calculating means (S44) selects the optimum map from a plurality of control maps establishing correlation between the drive torque increase characteristic and the elapsed time from the time of the start of control for stopping the operation of the compressor (2) and calculates the estimated drive torque (STrk) based on the heat load of the refrigeration cycle (1). As a result, it is possible to make the estimated drive torque (STrk) a high precision estimated value suppressed in discrepancy from the actual drive torque of the compressor (2) in the transitory state at the time of the start of control for stopping the operation of the compressor (2).

Further, the present invention has as its third aspect a compressor drive torque estimating device of the first aspect, wherein the heat load detecting means (124, 125) include a suction side detecting means (124) for detecting a physical quantity relating to a suction side pressure of the compressor (2), wherein the compressor (2) is a variable capacity type compressor configured to enable change of an amount of discharge of refrigerant by a change in pressure of the control chamber (23), wherein the variable capacity type compressor has an extract passage control means (32) provided in an extract passage (29) connecting the control chamber (23) and suction refrigerant pressure region (26) of the variable capacity type compressor and able to adjust a passage opening degree of the extract passage (29) based on a suction side detected value detected by the suction side detecting means (124), wherein the estimated drive torque characteristic selecting means (S42) selects one of the plurality of estimated drive torque characteristics stored in the storage unit based on at least a suction side detected value detected by the suction side detecting means (124), and wherein the estimated drive torque calculating means (S44) selects an optimum characteristic from the plurality of estimated drive torque characteristics establishing correlation between the drive torque increase characteristic and elapsed time from a time of start of operation of the compressor (2) and calculates an estimated drive torque (STrk) based on a suction side detected value of the variable capacity type compressor.

The extract passage control means (32), which is provided in the extract passage (29) of the variable capacity type compressor, increases the passage opening degree of the extract passage (29), when the suction side detected value becomes larger than a predetermined value. Afterward, when the suction side detected value becomes a predetermined value or less, it decreases the passage opening degree to a predetermined opening degree and maintains the predetermined opening degree.

Along with a change in the suction side detected value, the pressure in the control chamber (23) changes, and therefore the characteristic of torque change also fluctuates. In this way, when providing the extract passage control means (32) in extract passage (29) of the variable capacity type compressor, a change in the suction side detected value has a great effect on the compressor torque increase characteristic.

When providing the extract passage control means (32) in the extract passage (29) of the variable capacity type compressor, the estimated drive torque calculating means (S44) selects the optimum map from a plurality of control maps establishing correlation between the drive torque increase characteristic and the elapsed time from the time of start of control for stopping operation of the compressor (2), and calculates the estimated drive torque (STrk) based on at least the suction side detected value.

Therefore, it is possible to make the estimated drive torque (STrk) a high precision estimated value suppressed in discrepancy from the actual compressor drive torque in the transitory state right after compression start of the variable capacity type compressor.

Further, in the compressor drive torque estimating device of the third aspect, the heat load detecting means (124, 125) include a discharge side detecting means (125) for detecting a physical quantity relating to the discharge side pressure of the compressor (2), and the estimated drive torque characteristic selecting means (S42) selects one of the plurality of estimated drive torque characteristics stored in the storage unit based on a discharge side detected value detected by the discharge side detecting means (125) and the suction side detected value detected by the suction side detecting means (124).

According to this, it is possible to select the optimum characteristic from the plurality of estimated drive torque characteristics establishing correlation between the drive torque increase characteristic and the elapsed time from the time of start of operation of the compressor (2) based on the suction side detected value plus the discharge side detected value.

Further, in a compressor drive torque estimating device of the third aspect, when the suction side detected value is the outlet refrigerant temperature of the evaporator (6), since the outlet refrigerant temperature of the evaporator (6) is substantially equal to the refrigerant evaporation temperature in the evaporator (6), it is possible to use this refrigerant evaporation temperature to detect the suction side pressure of the compressor in the evaporator (6). As a result, the detecting means for directly detecting the suction side pressure of the compressor becomes unnecessary.

Further, the present invention has as its fourth aspect a compressor drive torque estimating device of the first and second aspects, wherein the heat load detecting means (124, 125) include a discharge side detecting means (125) for detecting a physical quantity relating to a discharge side pressure of the compressor (2), and wherein the estimated drive torque characteristic selecting means (S42) selects the one of the plurality of estimated drive torque characteristics stored in the storage unit based on at least the discharge side detected value detected by the discharge side detecting means (125).

According to this, the means selects the optimum characteristic from the plurality of estimated drive torque characteristics, establishing correlation between the drive torque increase characteristic and elapsed time from the time of the start of operation of the compressor (2), and calculates the estimated drive torque (STrk) based on the discharge side detected value.

As a result, it is possible to make the estimated drive torque (STrk) a high precision estimated value suppressed in discrepancy from the actual drive torque of the compressor (2) in the transitory state of the start of operation of the compressor (2) or starting control to stop the operation.

Further, in the compressor drive torque estimating device of the fourth aspect, the heat load detecting means (124, 125) include a suction side detecting means (124) for detecting a physical quantity relating to the suction side pressure of the compressor (2), and the estimated drive torque characteristic selecting means (S42) selects one of the plurality of estimated drive torque characteristics stored in the storage unit based on the discharge side detected value detected by the discharge side detecting means (125) and the suction side detected value detected by the suction side detecting means (124).

According to this, it is possible to select the optimum characteristic from the plurality of estimated drive torque characteristics based on the discharge side detected value plus the suction side detected value.

Further, the plurality of estimated drive torque characteristics may also be increase degrees ($\Delta$Trk) showing the change in the estimated drive torque (STrk) for each predetermined time interval. In this case, the estimated drive torque (STrk) is calculated by adding to the actual drive torque of the compressor a increase degree ($\Delta$Trk) in accordance with the elapsed time from the time of start of operation of the compressor and the time of start of stopping of the operation.

Note that the notations in parentheses after the above means show correspondence with specific means described in the later mentioned embodiments.

BEST MODE FOR CARRYING OUT THE INVENTION

The present invention may be more fully understood from the description of preferred embodiments of the invention, as set forth below, together with the accompanying drawings.

First Embodiment

Below, a first embodiment of the present invention will be explained based on FIG. 1 to FIG. 5. The present embodiment is an application of the present invention to an idling speed control device for a vehicle. The vehicle of the present embodiment uses as a refrigerant compressor of a vehicular air-conditioning system a variable capacity type compressor 2 obtaining drive power from an engine 11 for operating the vehicle. The idling speed control device is designed to control the engine speed based on an estimated drive torque STrk of a later mentioned variable capacity type compressor 2.

Figure 1:
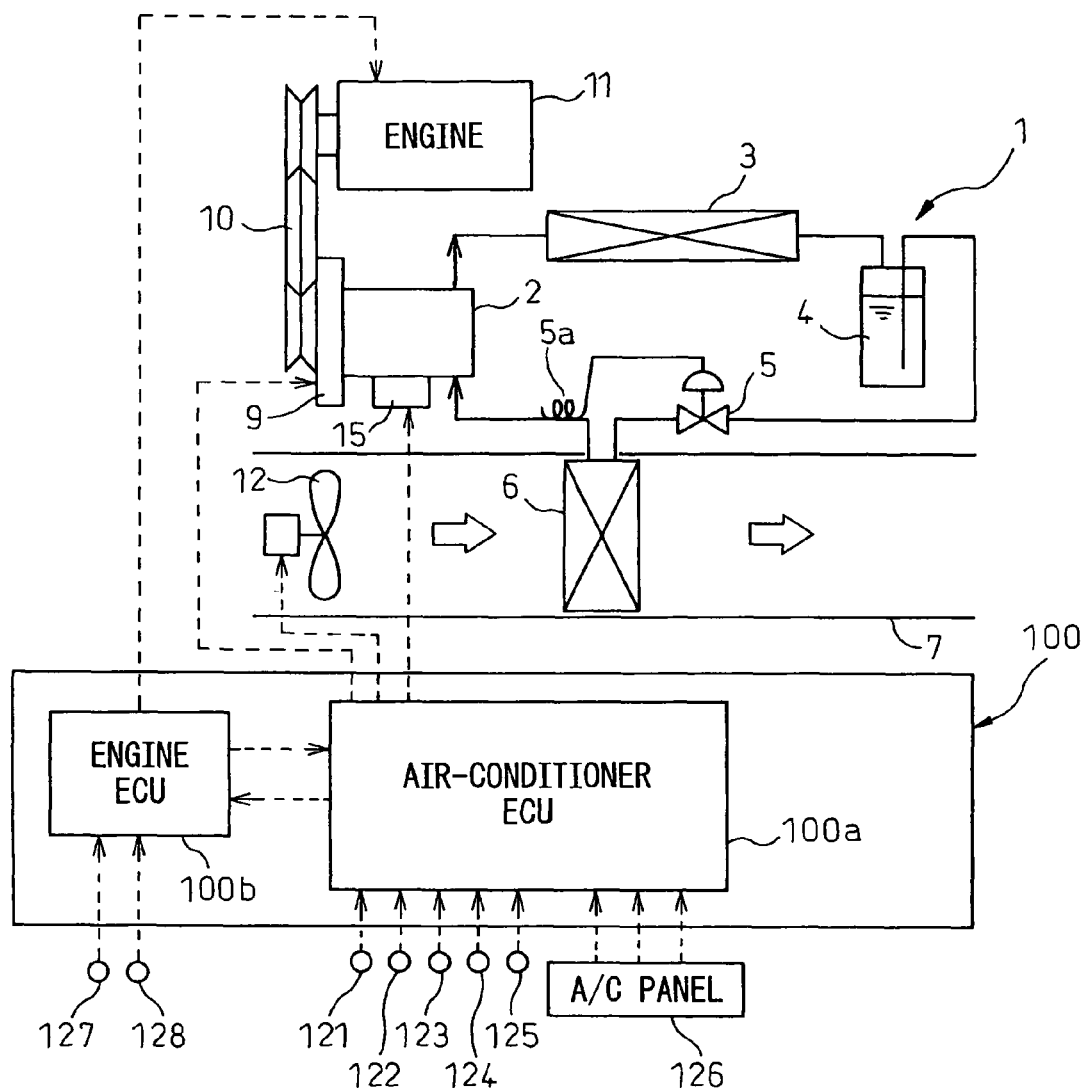
FIG. 1 is a schematic view of an idling speed control device according to a first embodiment.

FIG. 1 is a schematic view of the overall configuration of the present embodiment. The engine 11 has an intake pipe (not shown). Inside the intake pipe, a throttle valve (not shown) is arranged. The throttle valve adjusts the amount of air sucked into the intake pipe in accordance with the opening degree accompanying depression of an accelerator pedal of the vehicle. Further, as is well known, in the engine 11, the engine speed (output) is adjusted by the amount of suction air and amount of fuel injection.

The intake pipe is provided with a bypass line (not shown). In the bypass line, an idling control valve (not shown) is arranged. The idling control valve changes the amount of bypass of the flow of suction air from upstream to downstream of the throttle valve in accordance with the valve opening degree. The idling speed of the engine is adjusted by the amount of bypass of this flow of suction air.

The idling control valve is configured by a known linear solenoid valve. It is designed to be electrically controlled by a drive voltage Visc output from a later mentioned engine control unit 100b (engine ECU) to be changed in valve opening degree.

Part of the vehicular air-conditioning system, that is, a refrigeration cycle 1, is arranged inside the engine compartment and has a variable capacity type compressor 2. The refrigeration cycle (1) in the present invention uses as a refrigerant R134a. The refrigerant of the refrigeration cycle (1) is not limited to R134a. $CO_2$ etc. may also be used.

The variable capacity type compressor 2 sucks in, compresses, and discharges the refrigerant at the downstream side of the later mentioned evaporator 6 in the refrigeration cycle 1. It is driven to rotate by drive power transmitted from the engine 11 through an electromagnetic clutch 9 and belt mechanism 10.

In the present embodiment, the drive source for giving drive power to the variable capacity type compressor 2 is the engine 11. Further, in the present embodiment, a known variable capacity type compressor 2, such as a swinging swash plate type compressor, is employed. The variable capacity type compressor 2 enables continuous variable control of the discharge capacity by a control signal from the outside. The "discharge capacity" is the geometric capacity of the working space where suction and compression of the refrigerant are performed. Specifically, it is the cylinder capacity between top dead center and bottom dead center of the piston stroke.

In the swash plate type of variable capacity type compressor 2, there is provided a variable capacity device 15 having an electromagnetic type pressure control device controlling the pressure of the later mentioned swash plate chamber 23 utilizing the discharge pressure and the suction pressure. The general configuration of the variable capacity type compressor 2 of the present embodiment will be explained later.

A discharge side of the variable capacity type compressor 2 is connected to an inlet side of a condenser 3. This condenser 3 is a radiator arranged inside an engine compartment between the engine 11 and a vehicle front grille (not shown), and exchanging heat between refrigerant discharged from the variable capacity type compressor 2 and outside air blown by a blower fan (not shown) so as to cool the refrigerant.

An outlet side of the condenser 3 is connected to an inlet side of an air-liquid separator 4. Cooled by the condenser 3, the refrigerant is separated by the air-liquid separator 4 into a gas phase refrigerant and liquid phase refrigerant.

The liquid phase refrigerant outlet side of the air-liquid separator 4 is connected to an expansion valve (throttle valve) 5. The expansion valve 5 reduces the pressure to cause the liquid phase refrigerant separated at the air-liquid separator (separator) 4 to expand and adjusts the flow rate of the refrigerant flowing out from the outlet side of the expansion valve 5.

Specifically, the expansion valve 5 has a feeler bulb 5a for detecting the refrigerant temperature between the variable capacity type compressor 2 and later mentioned evaporator 6. It detects the superheat ratio of the suction side refrigerant of the compressor 2 based on the temperature and pressure of the refrigerant sucked into the variable capacity type compressor 2. It adjusts the valve opening degree so that this superheat ratio becomes a preset predetermined value.

A downstream side of the expansion valve 5 is connected to an evaporator 6. The evaporator 6 is a heat exchanger arranged inside the air-conditioning case of the air-conditioning unit and is blown with air by a blower fan 12 arranged inside the air-conditioning case 7. Refrigerant reduced in pressure and expanded by the expansion valve 5 exchanges heat with the blown air.

The air inside the passenger compartment (inside air), or air outside the passenger compartment (outside air) is sucked in from a known inside/outside air switchbox (not shown) provided at the air-conditioning case 7. The air is blown by the blower 12 into the air-conditioning case 7 toward the inside of the passenger compartment. This blown air passes through the evaporator 6, then passes through a heater unit (not shown) and is blown from vents into the passenger compartment.

An evaporator temperature sensor 124 is provided at the location in the air-conditioning case 7 right after venting of air of the evaporator 6. The sensor 124 comprises a thermistor detecting temperature of discharged air right after passing through the evaporator 6. The evaporator temperature sensor 124 will be explained later.

Furthermore, at the downstream end of the air in the air-conditioning case 7, there are face vents (not shown) for blowing air to the upper torsos of the passengers in the passenger compartment, foot vents for blowing air to the feet of the passengers in the passenger compartment, and defroster vents for blowing air to the inside surface of the front glass are formed. A vent mode door (not shown) for opening and closing these vents is provided.

A downstream side of the evaporator 6 is connected to a later mentioned suction port 21 of the variable capacity type compressor 2. The refrigerant after evaporation flows into the variable capacity type compressor 2. In this way, in the refrigeration cycle 1, the refrigerant is designed to circulate in the order of the variable capacity type compressor 2→condenser 3→air→liquid separator 4→expansion valve 5→evaporator 6→variable capacity type compressor 2.

An outline of the electrical control unit 100 of the present embodiment will be explained. The electrical control unit 100 is provided with an air-conditioner control unit 100a (air-conditioner ECU) and an engine control unit 100b (engine ECU). These are respectively comprised of known microprocessors including CPUs, ROMs, RAMs, etc. and their peripheral circuits.

The air-conditioner control unit 100a performs overall control of the vehicular air-conditioning system. The control is based on the sensor detection signals from the group of air-conditioning sensors 121 to 125, and the operation signals from the various types of air-conditioner operation switches which are provided at the air-conditioning operation panel 126 and are arranged near the instrument panel at the front of the inside of the passenger compartment. The air-conditioner control unit 100a stores control programs etc. of the air-conditioner control equipments 9, 15 in the ROM of the microprocessor and performs various types of processing based on the control programs etc.

As the group of air-conditioning sensors, specifically, an outside air sensor 121 detecting an outside air temperature Tam, an inside air sensor 122 detecting an inside air temperature Tr, a sunlight sensor 123 detecting an amount of sunlight Ts entering the passenger compartment, an evaporator temperature sensor 124 arranged at an air discharge part of the detecting evaporator 6 and detecting an evaporator discharge air temperature Te, and a high pressure side pressure sensor 125 detecting a discharge refrigerant pressure Pd discharged from the variable capacity type compressor 2, etc, are provided.

In the present embodiment, the high pressure side pressure sensor 125 is the discharge side detecting means for detecting a physical quantity relating to a discharge refrigerant pressure Pd of the variable capacity type compressor 2. That is to say, the discharge refrigerant pressure Pd becomes the discharge side detected value. This high pressure side pressure sensor 125 is usually provided for detecting a pressure abnormality in the refrigeration cycle 1. There is no need to newly provide a dedicated detecting means for detecting a physical quantity relating to the discharge refrigerant pressure Pd.

Furthermore, in the present embodiment, the evaporator temperature sensor 124 is the suction side detecting means for detecting a physical quantity relating to the suction refrigerant pressure Ps of the variable capacity type compressor 2, while the evaporator discharge air temperature Te becomes the suction side detected value.

Since the evaporator discharge air temperature Te is substantially equivalent to the refrigerant evaporation temperature in the evaporator 6, it is possible to determine the refrigerant evaporation pressure in the evaporator 6 (that is, the suction refrigerant pressure Ps of the variable capacity type compressor 2), based on this refrigerant evaporation temperature.

As switches provided at the air-conditioning operation panel 126, there are an air-conditioner switch for sending an operational command signal of the variable capacity type compressor 2, a vent mode switch for setting the vent mode, an auto switch for emitting a command signal for the automatic control mode of air-conditioning, and a temperature setting switch serving as the temperature setting means for setting the temperature in the passenger compartment, etc.

At the output side of the microprocessor of the air-conditioner control unit 100a, an electromagnetic clutch 9, and a blower fan 12 of the evaporator 6, etc. are connected through peripheral circuits of various types of drive circuits for driving actuators (not shown). A variable capacity device 15 of the variable capacity type compressor 10 is also connected to the output side of the microprocessor. Further, the operations of these various types of actuators 9, 12, 15 are controlled by output signals of the air-conditioner control unit 100a.

The air-conditioner control unit 100a is connected to the vehicle side engine control unit 100b. These two control units 100a, 100b are designed to be able to input and output signals with each other.

The engine control unit 100b controls the amount of fuel injection to the vehicle engine 11 and the ignition timing, etc. to the optimum values, based on the sensor detection signals from a group of engine sensors 127, 128, which detect the operating state of the vehicle engine 11 etc., and a later mentioned control map of the compressor estimated drive torque STrk. The engine control unit 100b stores a processing program for calculating the estimated drive torque STrk and a control program of the idling control valve 20c etc. in the ROM of the microprocessor and performs various type of processing based on that control program.

Figure 2:
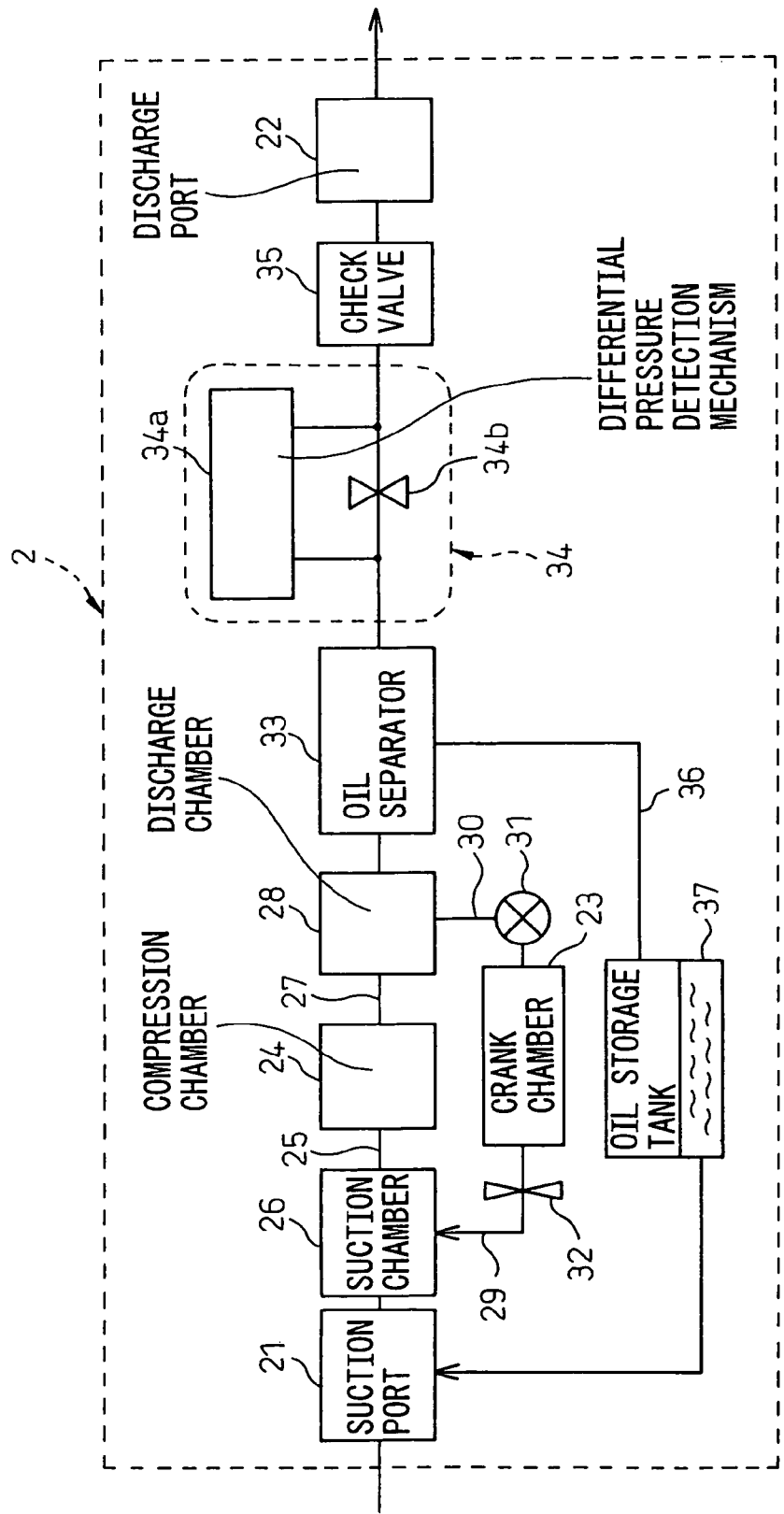
FIG. 2 is a schematic block diagram of a compressor according to the first embodiment.

As the group of engine sensors, specifically, an engine speed sensor 127 for detecting an engine speed Ne, a throttle sensor 128 for detecting an opening degree of a throttle valve, etc. are provided. The throttle valve adjusts the amount of air sucked into an intake pipe in accordance with an opening degree of depression of the accelerator pedal of the vehicle Next, a variable capacity type compressor 2 used in the present embodiment will be explained based on FIG. 2. FIG. 2 is a schematic block diagram of a variable capacity type compressor 2 of the present embodiment.

The variable capacity type compressor 2 is provided with a housing (not shown) having a suction port 21 for suction of refrigerant at the downstream side of the evaporator 6 and a discharge port for discharging refrigerant compressed at a later mentioned compression chamber 24.

Inside the housing, a suction passage 25 connecting the suction port 21 and compression chamber 25 through a suction chamber 26, and a discharge passage 27 connecting the compression chamber 24 and discharge port 22 through a discharge chamber 28 etc. are provided. Refrigerant sucked in from the evaporator 6 passes through the suction passage 25 and flows into the compression chamber 24, while refrigerant compressed at the compression chamber 24 passes through the discharge passage 27 and flows out to the condenser 3.

Inside the housing of the variable capacity type compressor 2, a crank chamber 23 as a control chamber is formed. Inside the crank chamber 23, there are a drive shaft (not shown), which is operatively coupled with the vehicle engine 11 and driven to turn by the supply of power from the engine 11. A swash plate (not shown) is supported slantwise for the drive shaft in order to change the compressor discharge capacity by the slant angle.

Further, inside the housing, a cylinder bore (not shown) is formed. A piston (not shown) is accommodated inside the cylinder bore to be able to reciprocate. The piston is engaged with the outer circumference of the swash plate through a shoe (not shown). Therefore, rotational movement of the swash plate accompanying rotation of the drive shaft is converted to reciprocating motion of the piston. A space in the cylinder bore for compressing the refrigerant by the piston of the present embodiment corresponds to the compression chamber 24.

The compression chamber 24 is communicated through the suction passage 25 with the suction chamber 26 into which the refrigerant flows from the evaporator 6 and sucks in and compresses the refrigerant from the suction chamber 26. Further, the compression chamber 24 is communicated through the discharge passage 27 with the discharge chamber 28 and discharges the refrigerant compressed at the compression chamber 24 to the discharge chamber 28. Note that the suction chamber 26 of the present embodiment corresponds to the suction refrigerant pressure region of the present invention.

Inside the housing of the variable capacity type compressor 2, an extract passage 29 and an intake passage 30 are provided. The extract passage 29 communicates the crank chamber 23 and suction chamber 26. Further, the intake passage 30 communicates the discharge chamber 28 and the crank chamber 23.

In the housing, a first control valve 31 is provided in the middle of the intake passage 30, while a second control valve 32 is provided in the middle of the extract passage 29. The variable capacity device 15 in the compressor 2 is comprised of the crank chamber 23, first control valve 31, second control valve 32, extract passage 29, and intake passage 30, etc. The second control valve 32 of the present embodiment corresponds to the extract passage control means of the present invention.

The first control valve 31 and second control valve 32 are controlled by a control signal (control current In) output from the microprocessor 100 of the electrical control unit.

The first control valve 31 adjusts the opening degree of the intake passage 30 to control the amount of introduction of refrigerant into the crank chamber 23 and thereby determines the internal pressure of the crank chamber 23. In accordance with the change in the internal pressure of the crank chamber 23, the difference between the internal pressure of the crank chamber 23 and the internal pressure of the compression chamber 24 is changed and therefore the slant angle of the swash plate is changed. As a result, the piston stroke, that is, the compressor discharge capacity, is adjusted.

Due to this, the variable capacity type compressor 2 can be changed in discharge capacity continuously in the range from about 0% to 100%. For example, if the internal pressure of the crank chamber 23 drops, the slant angle of the swash plate is increased and the discharge capacity is increased. Conversely, if the internal pressure of the crank chamber 23 rises, the slant angle of the swash plate is decreased and the discharge capacity is decreased.

Since the variable capacity type compressor 2 can be changed in discharge capacity continuously in the range from about 0% to 100%, by reducing the discharge capacity to close to about 0%, it is possible to set the variable capacity type compressor 2 to a substantially stopped state. Therefore, it is also possible to adopt a clutchless configuration coupling the rotating shaft of the variable capacity type compressor 2 to the vehicle engine 11 by a belt mechanism at all times.

The second control valve 32 controls the opening degree of the extract passage 29 based on the suction refrigerant pressure Ps. The second control valve 32 in the present embodiment is used as a valve (CS valve) for dealing with delays in startup occurring due to accumulation of liquid at the variable capacity type compressor 2.

Such delays in startup of a variable capacity type compressor 2 will be explained as follows. In a state where the variable capacity type compressor 2 has been stopped for a long period of time, there will be liquid refrigerant on the low pressure side of the refrigeration cycle 1. The crank chamber 23 and the suction chamber 26 are communicated through the extract passage 29, so the liquid refrigerant flows through the suction chamber 26 into the crank chamber 23. If starting up the compressor 2 in this state, the liquid refrigerant in the crank chamber blocks the opening area of the extract passage 29 and a pressure difference is caused before and after the extract passage 29. As a result, the compressor ends up being held at the discharge capacity of the smallest slant angle of the swash plate in the crank chamber 23. Therefore, the desired cooling ability cannot be obtained until the liquid refrigerant in the crank chamber 23 is sufficiently drained, so delays occur in compressor startup.

To solve this problem, when detecting that the suction refrigerant pressure Ps is an abnormally high pressure, the opening degree of the second control valve 32 provided in the extract passage 29 is increased. Due to this, it is possible to quickly discharge liquid refrigerant present in the crank chamber 23 into the suction chamber 26, so it is possible to suppress delays in startup of the variable capacity type compressor 2.

Explaining this more concretely, when the suction refrigerant pressure Ps becomes larger than a predetermined abnormal pressure value right after start of operation of the compressor, that is, liquid refrigerant accumulates in the crank chamber 23 of the variable capacity type compressor 2, the second control valve 32 increases the opening degree of the extract passage 29 and discharges the liquid refrigerant accumulated in the crank chamber 23 to the suction chamber. When the suction refrigerant pressure becomes below the predetermined abnormal pressure value, the opening degree of the extract passage 29 is reduced to maintain the predetermined opening degree. After the variable capacity type compressor 2 finishes starting up and becomes stable, the suction refrigerant pressure will never become larger than the abnormal pressure value, so the opening degree of the extract passage 29 is maintained at the predetermined opening degree.

Therefore, when the variable capacity type compressor 2 has a second control valve provided in the extract passage 29, such fluctuation of the suction refrigerant pressure Ps causes the discharge capacity to change in the transitory state right after start of operation of the compressor. As a result, fluctuation of the compressor suction refrigerant pressure Ps causes great fluctuation in the compressor torque.

In the discharge passage 27 between the compression chamber 24 and the discharge port 22, an oil separator 33, flow rate sensor 34, and check valve 35 are provided in order toward the downstream from the compression chamber 24.

The oil separator 33 is for separating the lubrication oil from the refrigerant discharged from the compression chamber 24. The lubrication oil separated by the oil separator 33 is supplied through an oil circulation path 36 to the suction port 21.

In the oil circulation path 36, an oil storage tank 37 of lubrication oil separated by the oil separator 33, is provided. The lubrication oil in the oil storage tank 37 is supplied to the suction port 21 utilizing the differential pressure between the suction port 21 and inside of the oil storage tank 37. For this reason, the lubrication oil circulates in the order of the suction port 21→suction chamber 26→compression chamber 24→discharge chamber 28→oil separator 33→oil storage tank 37→suction port 21.

At the downstream side of the oil separator 33, a flow rate sensor 34 is provided. In general, the larger the discharge capacity of a variable capacity type compressor 2 and the larger the flow rate of the refrigerant flowing through the refrigeration cycle 1, the greater the pressure loss in the refrigeration cycle 1. That is, the pressure loss between any two points in the refrigeration cycle 1 (differential pressure) is positively correlated with the flow rate of the refrigerant in the refrigeration cycle 1.

For this reason, by obtaining a grasp of the differential pressure ΔP(t)=PsH−PsL between two pressure monitoring points P1, P2, it is possible to indirectly detect the discharge capacity of the variable capacity type compressor 2. The flow rate sensor 34 in the present embodiment detects the pressure loss between two points (differential pressure) by a later mentioned differential pressure detector 34a so as to indirectly detect the flow rate of the refrigerant in the refrigeration cycle 1. Between the two pressure monitoring points P1, P2, a throttling part 34b is provided for generating the differential pressure ΔP(t).

Between the oil separator 33 and check valve 35 in the discharge passage 27 connecting the compression chamber 24 and the discharge port 22, a differential pressure detector 34a is provided. The differential pressure detector 34a is comprised of a first pressure sensor (not shown) detecting the pressure of a pressure monitoring point P1, a second pressure sensor (not shown) detecting the pressure of a pressure monitoring point P2, and a signal processing circuit (not shown) functioning as an electrical detecting means of differential pressure. In the discharge passage 27, two pressure monitoring points P1, P2 are provided separated by exactly a predetermined distance in the direction of flow of the refrigerant. The first pressure sensor detects the gas pressure PsH of the upstream side pressure monitoring point P1, while the second pressure sensor detects the gas pressure PsL at the downstream side pressure monitoring point P2. The signal processing circuit generates a new signal corresponding to the differential pressure ΔP(t) between PsH and PsL and outputs this to the control device 100 based on the detection signals of the gas pressures PsH, PsL input from the two sensors.

The check valve 35 is configured to open the valve opening degree, when the pressure on the flow rate sensor 34 side exceeds the pressure on the discharge port 22 side by a predetermined pressure around the check valve 35 in the discharge passage 27. The check valve 35 has the function of sending refrigerant from the discharge chamber 28 toward the discharge port 22 in the discharge passage 27. When the pressure on the flow rate sensor 34 side is sufficiently high due to operation of the variable capacity type compressor 2, the valve opening degree of the check valve 35 is opened up and circulation of the refrigerant in the refrigeration cycle 1 is maintained. On the other hand, when the compressor discharge capacity is minimized, that is, the pressure on the flow rate sensor 34 side is lower than the pressure on the discharge port 22 side, the valve opening degree of the check valve 35 is closed to cut off the circulation of the refrigerant of the refrigeration cycle 1.

The control processing executed by the electrical control unit 100 in the present embodiment will be explained based on the flow charts of FIGS. 3 to 4. The ignition switch of the vehicle engine 11 is turned on, the electrical control unit 100 is powered up by a battery B (not shown), then, in that state, when the operation signal from the air-conditioner operation switch becomes ON, the control routine is started.

Figure 3:
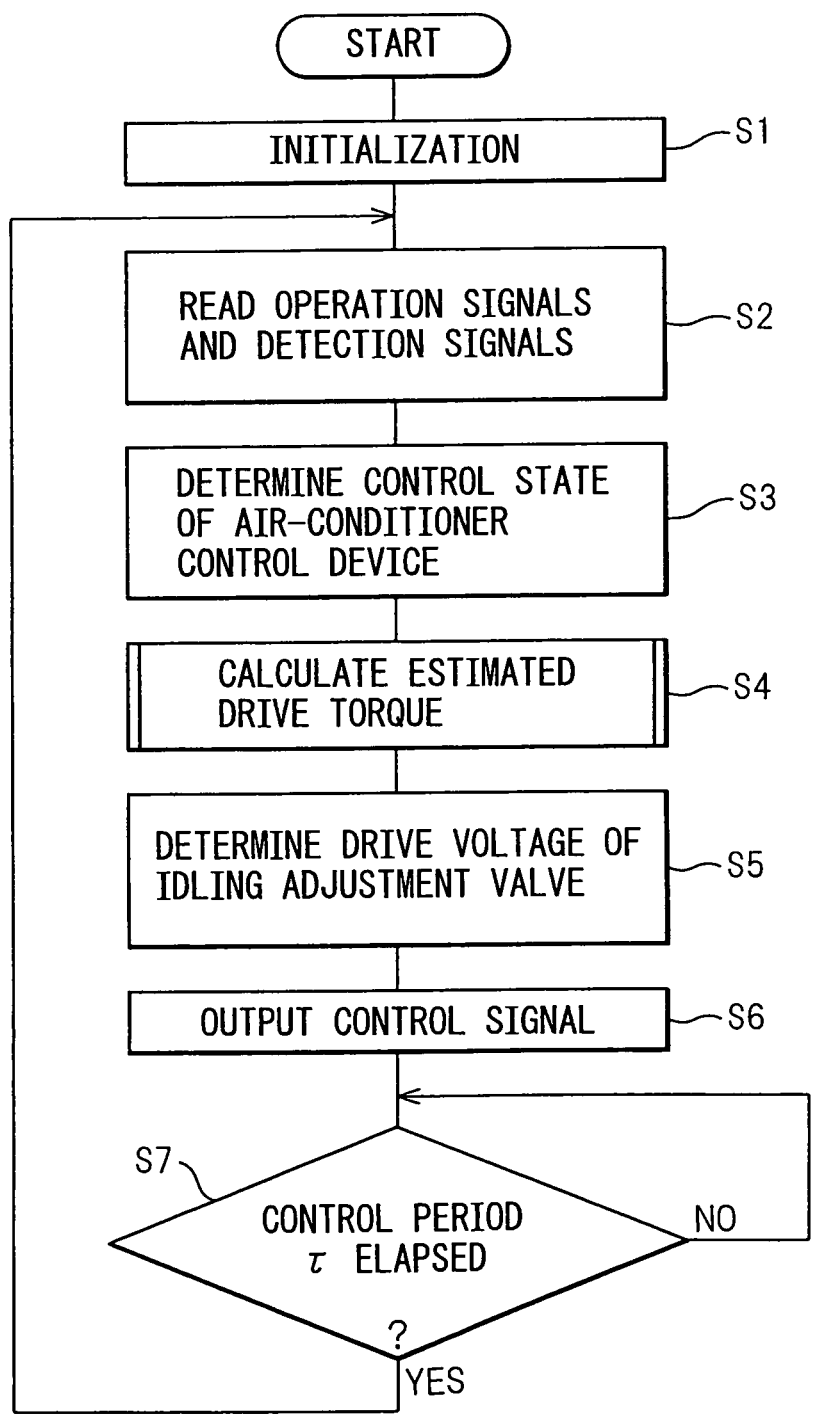
FIG. 3 is a flow chart showing control of an idling speed control device according to the first embodiment.
Figure 4:
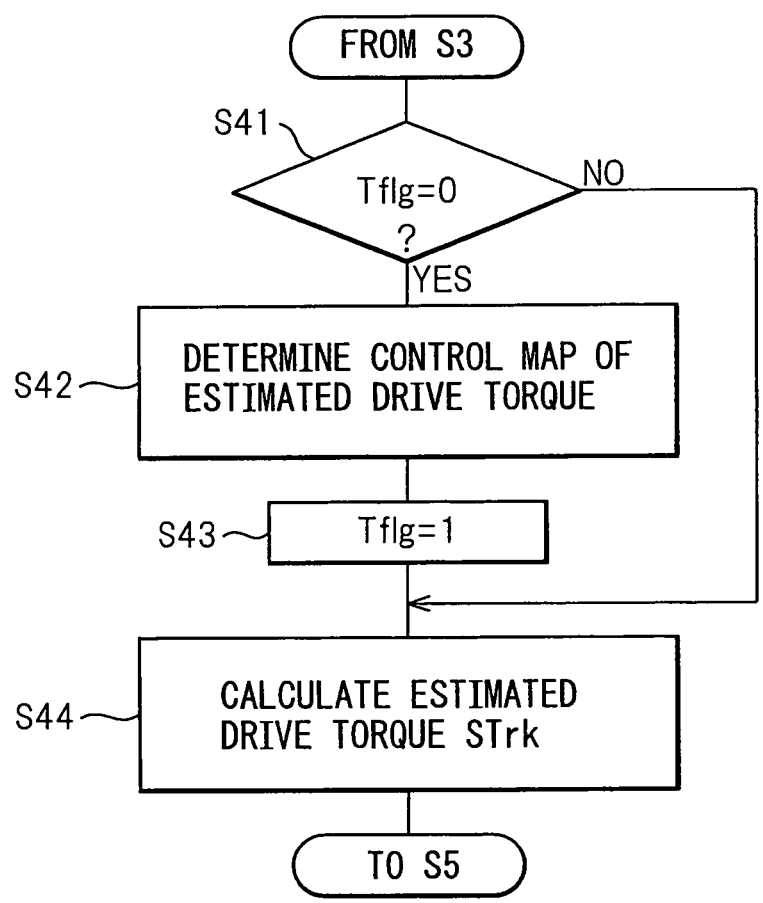
FIG. 4 is a flow chart showing outlines of the control of an idling speed control device according to the first embodiment.

At step S1 of FIG. 3, the flag, timer, etc. are initialized. There is a startup judgment flag Tflg indicating whether or not the time is right after startup of the variable capacity type compressor 2. At step S1, check if Tflg=0. A timer is built in the electrical control unit 100 and is the elapsed time counting measuring means for measuring the elapsed time T from the time when the compressor 2 starts compression.

At step S2, the operation signals of the air-conditioner operation switches and the detection signals of the group of air-conditioning sensors 121 to 125 and group of engine sensors 127, 128 are read.

At step S3, the control states of the various types of actuators 9, 12, 15, etc. for air-conditioning control are determined.

Specifically, it is determined to make the control signal for the electromagnetic clutch 9 in a conduction state. Furthermore, the target vent temperature TAO is calculated and this TAO is used to determine the control voltage Vfan applied to the electric motor of the blower fan 12, and the control current In of the variable capacity device 15 of the variable capacity type compressor 2, etc.

The target vent temperature TAO is calculated from the following numerical equation F1 based on the fluctuation of the air-conditioning heat load, the temperature inside the passenger compartment (inside air temperature) Tr, and the setting temperature Tset set by a temperature setting switch of the air-conditioner operation switches:

$$TAO = Kset \times Tset - Kr \times Tr - Kam \times Tam - Ks \times Ts + C \quad (F1)$$

where, Tr is the inside air temperature detected by the inside air sensor 122, Tam is the outside air temperature detected by the outside air sensor 121, Ts is the amount of sunlight detected by the sunlight sensor 123, Kset, Kr, Kam, and Ks are control gains, and C is a correction constant.

At step S4, the estimated drive torque STrk of the variable capacity type compressor 2 is estimated. Details of step S4 will be explained using the flow chart of FIG. 4. At step S41, it is judged if the time is right after startup of the variable capacity type compressor 2. If the startup judgment flag Tflg=0, it is judged that the time is right after startup and the routine proceeds to step S42. If Tflg is not 0, it is judged that the time is not right after startup and the routine proceeds to step S44.

At step S42, one optimum map is selected from a plurality of control maps storing increase degrees ΔTrk for gradually increasing the estimated drive torque STrk along with the increase of the elapsed time T based on the discharge side detected value read at step S2 (that is, the discharge refrigerant pressure Pd), and the suction side detected value (that is, the evaporator discharge air temperature Te). Step S42 of the present embodiment corresponds to the estimated drive torque characteristic selecting means of the present invention.

The suction refrigerant pressure Ps of the variable capacity type compressor 2 is calculated from the evaporator discharge air temperature Te. Further, one optimum control map is selected from a plurality of control maps stored in advance in the ROM of the electrical control unit 100 etc. The control map of the increase degree ΔTrk of the estimated drive torque STrk, is determined based on the discharge refrigerant pressure Pd and the suction refrigerant pressure Ps. The control map of the present embodiment corresponds to the estimated drive torque characteristic of the present invention.

Figure 5:
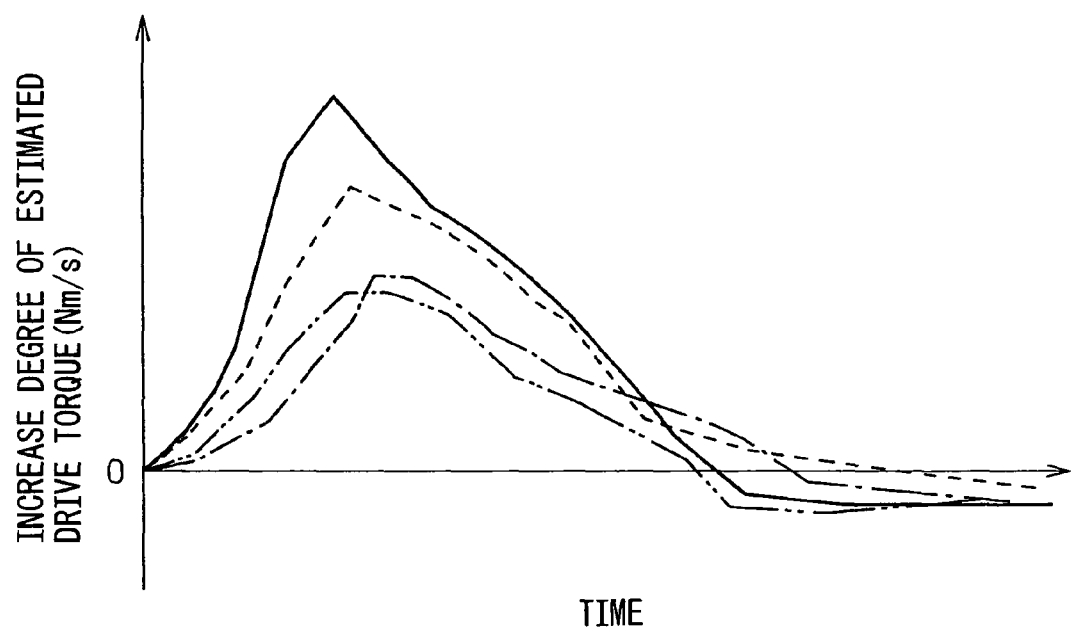
FIG. 5 is a graph showing the correlation between an elapsed time from the time of compressor startup and an increase degree of the estimated drive torque according to the first embodiment.

The control map of the present embodiment will be explained based on FIG. 5. FIG. 5 shows the increase degree ΔTrk for gradually increasing the estimated drive torque STrk along with the increase of the elapsed time T. In the present embodiment, four control maps are stored in the electrical control unit 100.

In the control maps of the present embodiment, as shown in FIG. 5, the solid line shows a control map in the case where the suction refrigerant pressure Ps is higher than the first predetermined pressure and the discharge refrigerant pressure Pd is higher than the second predetermined pressure, while the broken line shows a control map in the case where the suction refrigerant pressure Ps is the first predetermined pressure or less and the discharge refrigerant pressure Pd is higher than the second predetermined pressure.

Further, the one-dot broken line shows a control map in the case where the suction refrigerant pressure Ps is higher than a first predetermined pressure and the discharge refrigerant pressure Pd is the second predetermined pressure or less, while the two-dot broken line shows a control map in the case where the suction refrigerant pressure Ps is the first predetermined pressure or less and the discharge refrigerant pressure Pd is the second predetermined pressure or less. The control maps are calculated from actual measured values of the increase degree ΔTrk of the compressor drive torque at the time of compressor startup.

In the present embodiment, as shown in FIG. 5, the control map is made so that the increase degree ΔTrk of the estimated drive torque STrk at the time of compressor startup may become larger when the suction refrigerant pressure Ps is high than when it is low. This is because the variable capacity type compressor 2 of the present embodiment is provided with the second control valve 32 at the variable capacity mechanism 1 and fluctuations in the suction refrigerant pressure Ps have a major effect on the torque increase characteristic.

Due to step S42, a control map of the estimated drive torque having the elapsed time T as a variable is determined as shown in FIG. 5.

At step S43, Tflg=1 is set and the routine proceeds to step S44. At step S44, the estimated drive torque STrk is calculated based on the above control map of the estimated drive torque and the elapsed time T. Specifically, the estimated drive torque STrk is calculated from the following numerical equation F2:

$$STrk(t)=STrk(t-1)+\Delta Trk \cdot \Delta T \tag{F2}$$

where, t shows the sampling time of the elapsed time, while ΔT shows the sampling period.

Above, the numerical equation F2 is used to calculate the estimated drive torque STrk(t), then the routine proceeds to step S5 of FIG. 3.

At step S5, the drive voltage Visc to be output to the idling control valve is determined. When the engine is in an idling state, the drive voltage Visc is determined so that the engine speed Ne approaches a preset target idling speed Nco (for example, 600 to 800 rpm).

The drive voltage Vn may be set by adding an overlay drive voltage Vsic2 corresponding to the estimated drive torque STrk, to the reference drive voltage Visc1 determined in advance so that the engine speed becomes the target idling speed Nco.

At step S6, in order to obtain the control states determined at steps S3, S5, the electrical control unit 100 outputs output signals through the different drive circuits 131 to 133 to the idling control valve and the different air-conditioner control equipment 9, 12. At the next step S7, the system stands by for the control period τ. If judging the elapse of the control period τ, the routine returns to step S2.

In the present embodiment, due to the above control, the estimated drive torque STrk of the variable capacity type compressor 2 is estimated and this estimated drive torque STrk is used to control the drive voltage Visc output by the electrical control unit 100 for the idling control valve. Due to this, the effect is obtained that even if the drive torque of the compressor 11 changes, the engine speed will not fluctuate at the time of idling.

The high pressure side pressure sensor 125, evaporator temperature sensor 124, electrical control unit 100, and control routine (step S4) configure a compressor drive torque estimating device. Furthermore, this compressor drive torque estimating device, idling control valve, electrical control unit 100, and control routine (step S5, S6) configure a compressor drive source control device.

Furthermore, in the present embodiment, the estimated drive torque calculating means S44 selects the optimum map from the plurality of control maps storing the increase degree ΔTrk per unit time and calculates the estimated drive torque STrk based on the discharge refrigerant pressure Pd and evaporator discharge air temperature Te. For this reason, the estimated drive torque STrk can be made a high precision estimated value suppressed in discrepancy with the actual drive torque of the compressor in the transitory state right after compression start of the variable capacity type compressor 2.

That is, in the present embodiment, even in the transitory state right after compression start of the variable capacity type compressor 2, it is possible to greatly improve the stability of the idling speed since the idling speed is controlled based on the high precision estimated drive torque STrk suppressed in discrepancy with the actual drive torque.

Second Embodiment

A second embodiment of the present invention will be explained. In the second embodiment, only the parts different from the above first embodiment will be explained.

In the above first embodiment, the compressor estimated drive torque STrk is calculated in the case of using a variable capacity type compressor having a second control valve 32 for the variable capacity device 15 of the variable capacity type compressor 2. In the second embodiment, the compressor estimated drive torque STrk is calculated in the case of using a variable capacity type compressor 2 not having the second control valve 32.

The variable capacity type compressor 2 in the present embodiment does not have the second control valve 32, so the effect of the suction refrigerant pressure Ps on the compressor torque increase characteristic is small.

For this reason, it is possible to store control maps based on the differential pressure between the discharge refrigerant pressure Pd and the suction refrigerant pressure Ps in the ROM etc. of the electrical control unit 100 in advance, select one from the plurality of control maps, and thereby calculate the estimated drive torque STrk. Note that the control map is not limited to one based on the differential pressure of the discharge refrigerant pressure Pd and suction refrigerant pressure Ps. A control map based on the discharge refrigerant pressure Pd or a control map based on a high/low pressure ratio Pd/Ps of the discharge refrigerant pressure Pd and the suction refrigerant pressure Ps may also be used.

In this way, even in a variable capacity type compressor 2 not having a second control valve 32, one optimum control map is selected from a plurality of control maps stored in advance and the estimated drive torque STrk is calculated based on the discharge refrigerant pressure Pd and suction refrigerant pressure Ps. For this reason, the estimated drive torque STrk can be made a high precision estimated value suppressed in discrepancy with the actual drive torque of the compressor in the transitory state right after compression start of a variable capacity type compressor 2 not having a second control valve 32.

Third Embodiment

Next, a third embodiment of the present invention will be explained. In the third embodiment, only parts different from the above first embodiment and second embodiment will be explained.

In the above first embodiment and second embodiment, the estimated drive torque STrk of the variable capacity type compressor 2 in the transitory state right after compression start of the compressor 2 was calculated, but in the present embodiment, the estimated drive torque STrk of the variable capacity type compressor 2 is calculated in the transitory state after starting the operation for stopping operation of the variable capacity type compressor 2.

At step S2 of FIG. 2, when the OFF signal of the air-conditioner switch is detected in the operation signals of the air-conditioner operation switches, the one control map selected from the plurality of maps in the calculation of the estimated drive torque of step S4 is changed to a control map for the time of start of stopping the operation of the compressor. Note that the control map for the time of starting the stopping of the operation of the compressor is, like the control map for the time of starting operation of the compressor, stored in advance in a ROM etc. of the electrical control unit 100.

Figure 6:
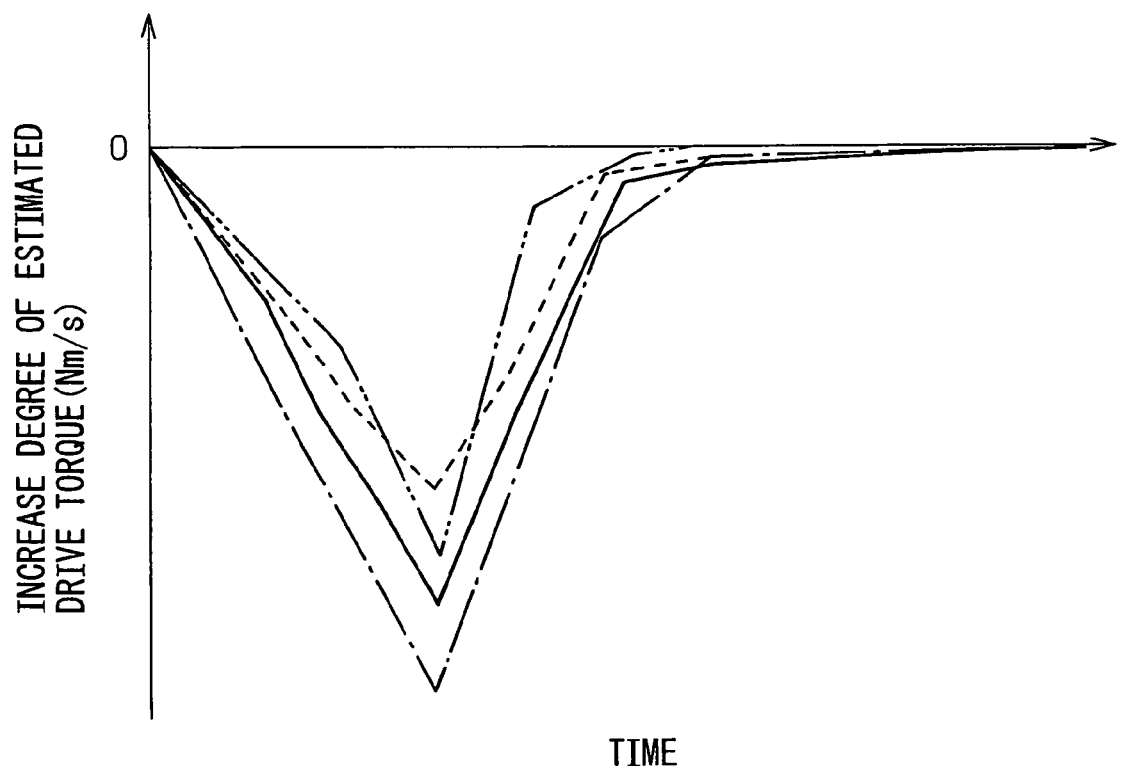
FIG. 6 is a graph showing the correlation between an elapsed time from the time of start of stopping of compressor operation and an increase degree of the estimated drive torque according to a third embodiment.

Specifically, in the control maps of the present embodiment, as shown in FIG. 6, the solid line shows a control map in the case where the suction refrigerant pressure Ps is higher than a first predetermined pressure and the discharge refrigerant pressure Pd is higher than a second predetermined pressure. The broken line shows a control map in the case where the suction refrigerant pressure Ps is the first predetermined pressure or less and the discharge refrigerant pressure Pd is higher than the second predetermined pressure.

The one-dot broken line shows a control map in the case where the suction refrigerant pressure Ps is higher than the first predetermined pressure and the discharge refrigerant pressure Pd is the second predetermined pressure or less. The two-dot broken line shows a control map in the case where the suction refrigerant pressure Ps is the first predetermined pressure or less and the discharge refrigerant pressure Pd is the second predetermined pressure or less.

In the present embodiment, one optimum control map is selected from the plurality of control maps for the time of the start of stopping of the operation of the compressor storing the increase degree ΔTrk and the estimated drive torque STrk is calculated based on the discharge refrigerant pressure Pd and suction refrigerant pressure Ps. For this reason, the estimated drive torque STrk can be made a high precision estimated value suppressed in discrepancy from the actual drive torque of a compressor in a transitory state at the time of start of stopping of the compression operation of the variable capacity type compressor 2.

Other Embodiments

In the above embodiments, for the control map, a control map of the estimate drive torque based on the discharge refrigerant pressure Pd and the suction refrigerant pressure Ps was used, but the invention is not limited to this. For example, it is also possible to use a control map of the estimated drive torque STrk per unit time or a control map of the estimated drive torque based on the power of the compressor.

In the first embodiment, the compressor drive torque increase characteristic is greatly affected by the suction refrigerant pressure Ps. Due to this, a control map based on only the suction refrigerant pressure Ps, a control map based on the pressure difference of the discharge refrigerant pressure Pd and the suction refrigerant pressure Ps, or a control map based on the high/low pressure ratio Pd/Ps of the discharge refrigerant pressure Pd and the suction refrigerant pressure Ps may be used.

Further, in the above embodiments, as the suction side detected value, the evaporator discharge air temperature Te was employed, but the suction side detected value is not limited to this. For example, it is also possible to employ the temperature of the heat exchange fins of the evaporator 6 as the suction side detected value. Furthermore, as the suction side detecting means, it is also possible to employ a low pressure side pressure sensor detecting a suction refrigerant pressure Ps of the variable capacity type compressor 2 and to employ the suction refrigerant pressure Ps detected by the low pressure side pressure sensor as the suction side detected value. Further, the suction refrigerant pressure Ps may also be a value detecting the low pressure side refrigerant pressure in the passage from the outlet side of the expansion valve 7 to the suction side of the variable capacity type compressor 2.

Further, the above second embodiment is explained in the case of use of a variable capacity type compressor 2 not having a second control valve 32, but the invention is not limited to a variable capacity type compressor 2 not having a second control valve 32. Similar effects can be obtained even with for example a fixed capacity type compressor or other compressor so long as being a compressor not having a second control valve 32.

The present invention is not limited in application to an idling speed control device. It is not limited to the above embodiments and can be applied to various applications so long as meeting the purport of the invention as described in the claims For example, the invention may also be applied to a stationary type heater or cooler having a variable capacity type compressor 2 driven by a stationary type engine. Further, it may also be applied to the case of controlling the amount of electric power supplied to a motor based on an estimated drive torque STrk for making the speed of the electric motor constant in a system having a variable capacity compressor 2 driven by an electric motor.

While the invention has been described by reference to specific embodiments chosen for purposes of illustration, it should be apparent that numerous modifications could be made thereto by those skilled in the art without departing from the basic concept and scope of the invention.

The invention claimed is:

1. A compressor drive torque estimating device to be adapted for a system provided with a refrigeration cycle in which a refrigerant is circulated by a compressor driven by an engine mounted in a vehicle, said compressor drive torque estimating device comprising:

heat load detecting means for detecting a heat load of said refrigeration cycle, a storage unit storing a plurality of estimated drive torque characteristics used to control an engine output, establishing correlation between a drive torque change of said compressor and an elapsed time from a time of start of operation of said compressor, wherein the drive torque change varies according to the elapsed time throughout from the time of the start of operation of the compressor, and wherein said plurality of estimated drive torque characteristics are change degrees showing changes in an estimated drive torque for each predetermined time interval, an estimated drive torque characteristic selecting means for selecting said one of the plurality of estimated drive torque characteristics stored in the storage unit based on detected values detected by said heat load detecting means, and an estimated drive torque calculating means for calculating an estimated drive torque of said compressor in a transitory state after the time of the start of operation of said compressor, based on said estimated drive torque characteristic selected by said estimated drive torque characteristic selecting means and the elapsed time,
wherein said estimated drive torque is calculated based on a drive torque change obtained from the correlation between said estimated drive torque characteristics and the elapsed time.

2. A compressor drive torque estimating device to be adapted for a system provided with a refrigeration cycle in which a refrigerant is circulated by a compressor driven by an engine mounted in a vehicle, said compressor drive torque estimating device comprising:

heat load detecting means for detecting a heat load of said refrigeration cycle, a storage unit storing a plurality of estimated drive torque characteristics used to control an engine output, establishing correlation between a drive torque change of said compressor and an elapsed time from a time of start of control for stopping operation of said compressor, wherein the drive torque change varies according to the elapsed time throughout from the time of the start of control for stopping operation of the compressor, and wherein said plurality of estimated drive torque characteristics are change degrees showing changes in an estimated drive torque for each predetermined time interval, an estimated drive torque characteristic selecting means for selecting said one of the plurality of estimated drive torque characteristics stored in the storage unit based on the detected value detected by said heat load detecting means, and an estimated drive torque calculating means for calculating an estimated drive torque of said compressor in a transitory state after the time of the start of control for stopping operation of said compressor, based on said estimated drive torque characteristic selected by said estimated drive torque characteristic selecting means and the elapsed time, wherein said estimated drive torque is calculated based on a drive torque change obtained from the correlation between said estimated drive torque characteristics and the elapsed time.

3. A compressor drive torque estimating device as set forth in claim 1, wherein said heat load detecting means include a suction side detecting means for detecting a physical quantity relating to a suction side pressure of said compressor, wherein said compressor is a variable capacity type compressor configured to enable change of an amount of discharge of refrigerant by a change in pressure of a control chamber, wherein said variable capacity type compressor has an extract passage control means provided in an extract passage connecting said control chamber and suction refrigerant pressure region of said variable capacity type compressor and able to adjust an opening degree of said extract passage based on a suction side detected value detected by said suction side detecting means, and wherein said estimated drive torque characteristic selecting means selects said one of the plurality of estimated drive torque characteristics stored in the storage unit based on at least a suction side detected value detected by said suction side detecting means.

4. A compressor drive torque estimating device as set forth in claim 3, wherein said heat load detecting means include a discharge side detecting means for detecting a physical quantity relating to a discharge side pressure of said compressor, and wherein said estimated drive torque characteristic selecting means selects said one of the plurality of estimated drive torque characteristics stored in the storage unit based on a discharge side detected value detected by said discharge side detecting means and the suction side detected value detected by said suction side detecting means.

5. A compressor drive torque estimating device as set forth in claim 3, wherein said suction side detected value is an outlet refrigerant temperature of said evaporator.

6. A compressor drive torque estimating device as set forth in claim 1, wherein said heat load detecting means includes discharge side detecting means for detecting a physical quantity relating to a discharge side pressure of said compressor, and wherein said estimated drive torque characteristic selecting means selects said one of the plurality of estimated drive torque characteristics stored in the storage unit based on at least the discharge side detected value detected by said discharge side detecting means.

7. A compressor drive torque estimating device as set forth in claim 6, wherein said heat load detecting means includes suction side detecting means for detecting a physical quantity relating to a suction side pressure of said compressor, and wherein said estimated drive torque characteristic selecting means selects one of the plurality of estimated drive torque characteristics stored in the storage unit based on the discharge side detected value detected by said discharge side detecting means and the suction side detected value detected by said suction side detecting means.

8. A compressor drive torque estimating device as set forth in claim 6, wherein said suction side detected value is an outlet refrigerant temperature of said evaporator.

9. A compressor drive torque estimating device as set forth in claim 1, wherein the estimated drive torque at the elapsed time is calculated by adding the drive torque change at the elapsed time to an estimated drive torque at the time before the predetermined time interval from the elapsed time.

10. A compressor drive torque estimating device as set forth in claim 1, wherein the estimated drive torque STrk (t) at sampling time t of the elapsed time is calculated from the estimated drive torque STrk (t−1) at sampling time t−1 of the elapsed time and the drive torque change ΔTrk, based on the following numerical equation:

$$STrk(t) = STrk(t-1) + \Delta Trk \cdot \Delta T$$

where, t shows the sampling time of the elapsed time, while ΔT shows the sampling period and t−1 shows the sampling time before the sampling period ΔT.

11. A compressor drive torque estimating device as set forth in claim 2, wherein the estimated drive torque at the elapsed time is calculated by subtracting the drive torque change at the elapsed time from an estimated drive torque at the time before the predetermined time interval from the elapsed time.

12. A compressor drive torque estimating device as set forth in claim 2,
wherein the estimated drive torque STrk (t) at sampling time t of the elapsed time is calculated from the estimated drive torque STrk (t−1) at sampling time t−1 of the elapsed time and the drive torque change ΔTrk, based on the following numerical equation:

$$STrk(t)=STrk(t-1)-\Delta Trk \cdot \Delta T$$

where, t shows the sampling time of the elapsed time, while ΔT shows the sampling period and t−1 shows the sampling time before the sampling period ΔT.

* * * * *